Dec. 16, 1930.  W. J. McLACHLAN  1,785,711
SYSTEM OF ELECTRIC DISTRIBUTION
Filed April 13, 1929
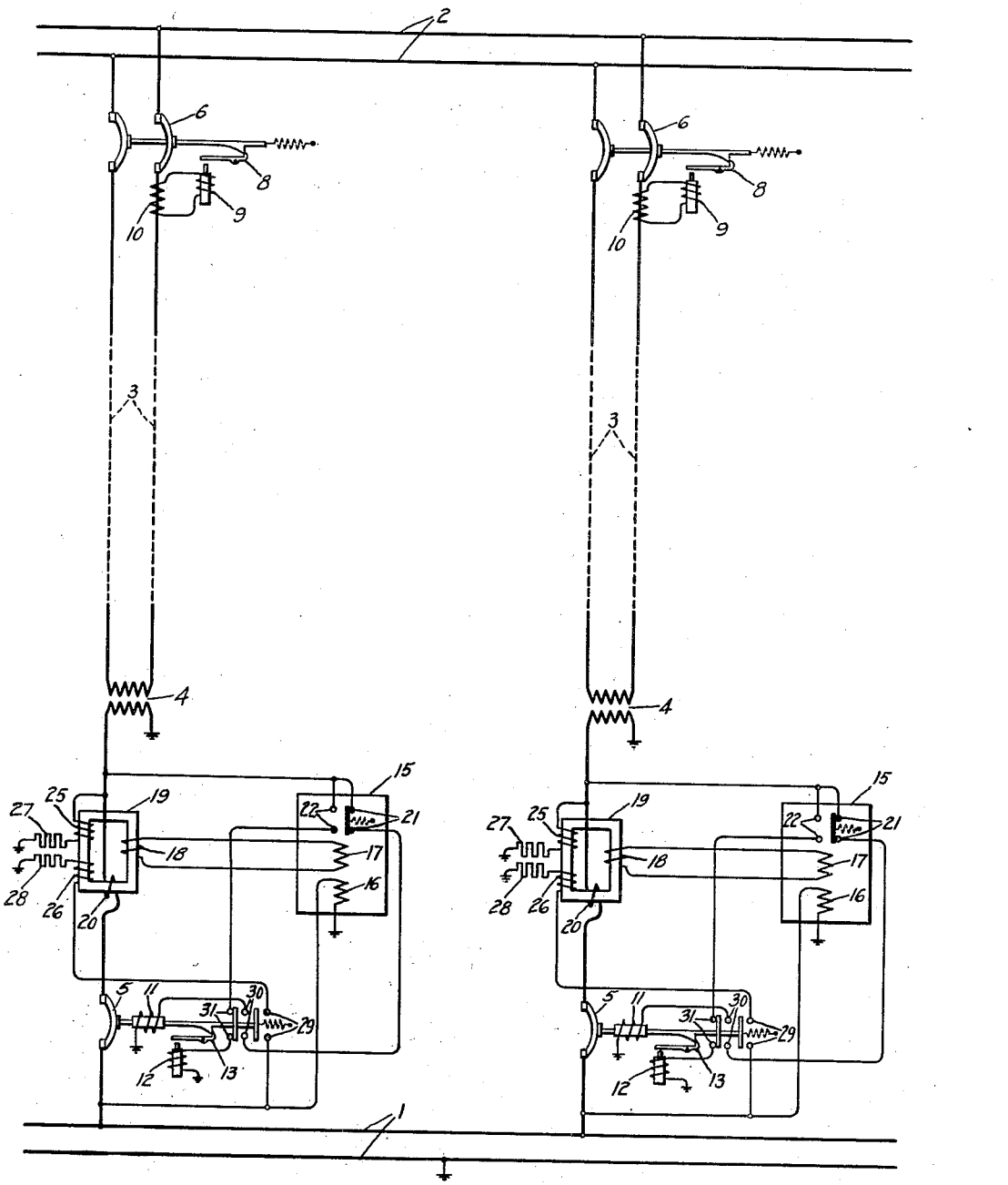
Inventor:
Willard J. Mc. Lachlan,
by Charles E. Tulla
His Attorney.

Patented Dec. 16, 1930

1,785,711

UNITED STATES PATENT OFFICE

WILLARD J. McLACHLAN, OF SCHENECTADY, NEW YORK, ASSIGNOR TO GENERAL ELECTRIC COMPANY, A CORPORATION OF NEW YORK

SYSTEM OF ELECTRIC DISTRIBUTION

Application filed April 13, 1929. Serial No. 354,961.

My invention relates to systems of electric distribution and particularly to alternating current networks which are supplied with current at a plurality of points by means of feeder circuits fed from the same or different sources of current. In such network systems it is desirable to be able to disconnect a feeder from the network whenever a fault occurs on the feeder or the feeder is disconnected from its source of current and to reconnect the feeder to the network automatically when the feeder is reenergized.

One object of my invention is to provide an improved arrangement for automatically effecting the disconnection of a feeder from a network when a reversal of energy flow occurs in the feeder and for reconnecting the feeder to the network when normal conditions have been restored in the feeder.

For the purpose of explaining the present invention it has been illustrated in the accompanying drawings as applied to an alternating current distribution with an interconnected secondary system but it will be understood that it may be applied to other systems of electric distribution and in general to two interconnected alternating current circuits which are subject to a reversal of energy flow between them.

My invention will be better understood from the following description taken in connection with the accompanying drawing, which diagrammatically shows an alternating current distribution system embodying my invention, and its scope will be pointed out in the appended claims.

Referring to the drawing, 1 is a single-phase network which is arranged to be supplied with electric energy from a suitable supply circuit 2 by means of a plurality of feeder circuits 3, two of which are shown in the drawing.

Each feeder circuit 3 includes a step-down transformer 4, the low voltage secondary winding of which is arranged to be connected to the network 1 by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit 3 by means of a current transformer 10. Any suitable means, either manually or automatically controlled, may be provided for closing the circuit breakers 6.

The circuit breakers 5 may also be of any suitable type, examples of which are well known in the art. As shown in the drawing, each circuit breaker 5 is of the well known latched-in type and includes a closing coil 11 which, when energized, closes the circuit breaker and a trip coil 12 which when energized releases a latch 13 which holds the circuit breaker in its closed position.

In order to effect the opening of a secondary circuit breaker 5 when a fault occurs in the associated transformer 4 or feeder circuit 3 or when the associated primary circuit breaker 6 is opened, each secondary circuit breaker 5 has associated therewith a power directional relay 15 which is arranged to effect the energization of the trip coil 12 of the circuit breaker when a predetermined amount of reverse power flows from the network to the associated feeder circuit. The power directional relays 15 may be of any suitable type examples of which are well known in the art. As shown, each power directional relay 15 includes a potential winding 16 which is permanently connected across the network 1 and a current coil 17 which is permanently connected across the secondary winding 18 of a current transformer 19 the primary winding 20 of which is connected in series relation with the secondary winding of the associated power transformer 4 and the network 1 when the associated circuit breaker 5 is closed. Each power directional relay 15 is arranged so that normally it maintains closed its contacts 21 which are in an energizing circuit for the closing coil 11 of the associated circuit breaker 5. When, however, more than a predetermined small amount of reverse power flows from the network 1 to a feeder circuit 3, the associated power directional relay 15 is arranged to open its contacts 21 and closes its contacts 22 which are in an energizing circuit for the trip coil 12 of the associated circuit breaker 5.

In order that each power directional relay 15 may also control the reclosing of the associated secondary circuit breaker 5, each current transformer 19 is provided with two differentially arranged windings 25 and 26 which are connected so that they are respectively energized in response to the secondary voltage of the associated power transformer 4 and the voltage of the network 1 when the circuit breaker 5 is open. Therefore, when a circuit breaker 5 is open a voltage which depends upon the relative phases and magnitudes of the secondary voltage of the associated power transformer 4 and the voltage of the network 1 is impressed across the current winding 17 of the associated relay 15. In order to reduce the current through the windings 25 and 26, the resistances of their respective circuits are made relatively high, preferably by means of the resistors 27 and 28 which are respectively connected in series with the windings 25 and 26. With such an arrangement the currents through the windings 25 and 26 remain at small values when the voltages impressed thereon are equal and in phase and there is zero flux set up in the current transformer by these windings.

In cases where it is desirable to have the power directional relays 15 arranged so that they operate in response to values of reverse power which vary with the feeder voltage, I can accomplish this result by controlling the circuits of one of the potential windings of the associated current transformer 19 by means of the auxiliary contacts on the associated circuit breaker 5 so that only one of the potential windings is energized when the associated circuit breaker 5 is closed. As shown in the drawing, I accomplish this result by providing each circuit breaker 5 with the auxiliary contacts 29 which are in the circuit of the winding 26 of the associated current transformer 19 and which are open when the circuit breaker is closed. Therefore, when each circuit breaker 5 is closed, the current winding 17 of the associated power directional relay 15 has a voltage impressed thereon which is the resultant of the voltages induced in the current transformer winding 18 by the windings 20 and 25. The windings 20 and 25 are arranged so that they both produce current of the proper phase in the circuit of the winding 17 to cause the relay 15 to maintain its contacts 21 closed when power flows through the respective feeder to the network. When, however, the power reverses the windings 20 and 25 oppose each other and when the magnetomotive force of the winding 20 predominates the relay 15 opens its contacts 21 and closes its contacts 22. The amount of reverse current required to cause the relay 15 to close its contacts 22 depends upon the voltage being impressed upon the winding 25. Therefore, the amount of reverse power required to operate the relay varies approximately directly with the secondary voltage of the associated power transformer.

The operation of the arrangement shown is as follows:—

When the circuit breakers 5 and 6 in a feeder 3 are closed and current is being supplied therethrough from the supply circuit 2 to the network 1, the associated power directional relay 15 maintains its contacts 21 closed. The current flowing in the current winding 17 of the associated power directional relay 15 is due to the resultant voltage induced in the winding 18 of the associated current transformer 19 by its voltage winding 25 which is responsive to the secondary voltage of the transformer 4 and the current winding 20 which is responsive to the current being supplied to the network.

When an abnormal condition occurs on a feeder which causes the current through the circuit breaker 5 therein to reverse, and the reverse current exceeds a predetermined amount which varies with the secondary voltage of the transformer, the associated power directional relay 15 opens its contacts 21 and closes its contacts 22. The closing of the contacts 22 connects the trip coil 12 and the auxiliary contacts 31 of the associated circuit breaker 5 across the secondary of the associated transformer 4 so that the circuit breaker 5 is opened. When the circuit breaker 5 opens, it closes its contacts 29 so that the winding 26 of the associated current transformer 19 is energized in response to the voltage of the network 1. Therefore, when a circuit breaker 5 is open, the current winding 17 of the associated power directional relay is energized in response to the relative phases and magnitudes of the network and transformer secondary voltages.

As long as the abnormal condition exists on the feeder the power directional relay maintains its contacts 22 closed. When, however, the feeder is restored to its normal voltage condition with respect to the network the relay 15 opens its contacts 22 and closes its contacts 21 thereby connecting the closing coil 11 and the auxiliary contacts 30 of the associated circuit breaker 5 across the secondary winding of the transformer 4 to effect the closing of the circuit breaker 5. After the circuit breaker closes and the circuit of its closing coil 11 is opened by the auxiliary contacts 30, it is held in its closed position by its latch 13. When the circuit breaker 5 closes, it effects the opening of the voltage winding 26 of the associated current transformer 19 so that the value of reverse power required to effect the opening of the relay contacts 21 and the closing of the relay contacts 22 varies directly with feeder voltage.

While I have, in accordance with the patent statutes, shown and described my invention as applied to a particular system and as embodying various devices diagrammatically indicated, changes and modifications will be obvious to those skilled in the art and I, therefore aim in the appended claims to cover all such changes and modifications as fall within the true spirit and scope of my invention.

What I claim as new and desire to secure by Letters Patent of the United States, is:

1. In combination, two alternating current circuits, a circuit breaker interconnecting said circuits, a current transformer having a primary winding connected in series with said circuits and a secondary winding, a relay controlling said circuit breaker having a winding connected to the secondary winding of said transformer, and two voltage windings on said current transformer respectively energized in response to the voltages of said circuits when said circuit breaker is open.

2. In combination, an alternating current supply circuit, an alternating current load circuit, a circuit breaker interconnecting said circuits, a current transformer having a primary winding energized in response to the current through said circuit breaker and a secondary winding, a power directional relay for controlling the opening and closing of said circuit breaker having a winding connected to said secondary winding, and two differentially wound windings on said current transformer respectively responsive to the voltages of said circuits when said circuit breaker is open.

3. In combination, an alternating current supply circuit, an alternating current network, a power transformer having its primary winding connected to said supply circuit and its secondary winding connected to said network, a circuit breaker between said transformer secondary winding and said network, a current transformer having a primary winding connected in series relation between said power transformer secondary winding and the network and a secondary winding, a power directional relay for controlling the opening and closing of said circuit breaker including a current winding connected across the secondary winding of said current transformer, and two differentially wound windings on said current transformer respectively energized in response to the power transformer secondary voltage and the network voltage when said circuit breaker is open.

4. In combination, an alternating current supply circuit, an alternating current network, a power transformer having its primary winding connected to said supply circuit and its secondary winding connected to said network, a circuit breaker between said transformer secondary winding and said network, a current transformer having a primary winding connected in series relation between said power transformer secondary winding and the network and a secondary winding, a power directional relay for controlling the opening and closing of said circuit breaker including a voltage winding energized in response to the network voltage and a current winding connected across the secondary winding of said current transformer, a relatively high resistance circuit including an energizing winding on said current transformer connected across said power transformer secondary winding, another relatively high resistance circuit including another energizing winding on said current transformer and differentially wound with respect to said other energizing winding connected across said network, and means controlled by said circuit breaker for effecting the opening of one of said relatively high resistance circuits when said circuit breaker is closed.

5. In combination, an alternating current supply circuit, an alternating current network, a power transformer having its primary winding connected to said supply circuit and its secondary winding connected to said network, a circuit breaker between said transformer secondary winding and said network, a current transformer having a primary winding connected in series relation between said power transformer secondary winding and the network and a secondary winding, a power directional relay for controlling the opening and closing of said circuit breaker including a current winding connected across the secondary winding of said current transformer, two differentially wound windings on said current transformer respectively energized in response to the power transformer secondary voltage and the network voltage, and means controlled by said circuit breaker for effecting the de-energization of one of said differentially wound windings when said circuit breaker is closed.

In witness whereof, I have hereunto set my hand this 12th day of April, 1929.

WILLARD J. McLACHLAN.